United States Patent
Walker et al.

(10) Patent No.: US 6,676,415 B2
(45) Date of Patent: Jan. 13, 2004

(54) TEACHING AID

(75) Inventors: Roger Walker, St. Albans (GB); Graham Hiskett, St. Albans (GB)

(73) Assignee: Direct Educational Services Limited, St. Albans (GB)

(*) Notice: Subject to any disclaimer, the term of this patent is extended or adjusted under 35 U.S.C. 154(b) by 0 days.

(21) Appl. No.: 10/220,793

(22) PCT Filed: Mar. 7, 2001

(86) PCT No.: PCT/GB01/00980

§ 371 (c)(1),
(2), (4) Date: Dec. 17, 2002

(87) PCT Pub. No.: WO01/67424

PCT Pub. Date: Sep. 13, 2001

(65) Prior Publication Data

US 2003/0148250 A1 Aug. 7, 2003

(30) Foreign Application Priority Data

Mar. 8, 2000 (GB) ................................. 0005464

(51) Int. Cl.$^7$ ................................. G09B 1/02
(52) U.S. Cl. ................................. 434/203; 434/402
(58) Field of Search ................................. 434/203, 204, 434/206, 215, 193, 174, 175, 402

(56) References Cited

U.S. PATENT DOCUMENTS

| 422,612 A | 3/1890 | Neuhaus | |
| 3,010,227 A | * 11/1961 | Glass | 434/174 |
| 3,710,456 A | * 1/1973 | Jerman | 434/203 |
| 4,026,043 A | 5/1977 | Caruso | |
| 4,233,757 A | 11/1980 | Narcise | |
| 5,382,165 A | * 1/1995 | Knox | 434/127 |
| 5,423,682 A | * 6/1995 | Hildebrandt | 434/195 |

FOREIGN PATENT DOCUMENTS

| AU | 199923783 | 10/1999 |
| GB | 1191718 | 5/1970 |

OTHER PUBLICATIONS

Corresponding GB patent application Search Report, dated Sep. 18, 2000.

International Search Report of PCT/GB01/00980, dated May 16, 2001.

International Preliminary Examination Report of PCT/GB01/00980, dated Jun. 24, 2002.

* cited by examiner

Primary Examiner—Jacob K. Ackun
(74) Attorney, Agent, or Firm—Christie, Parker & Hale, LLP

(57) ABSTRACT

A teaching aid comprises a frame (1), a plurality of elongate rods (2) mounted horizontally in the frame and spaced vertically from each other and a plurality of polyhedral blocks (3) rotatably mounted on each rod. Means are provided to releasably hold each block (3) in at least three discrete rotary positions on its respective rod (2).

5 Claims, 2 Drawing Sheets

TEACHING AID

The invention relates to teaching aids of the kind comprising a frame, a plurality of elongate rods mounted horizontally in the frame and vertically spaced from each other and a plurality of number-bearing carriers supported on each rod. In a known aid, the carriers can be flipped between two different positions so as to present one or other of their two sides.

The present invention provides a teaching aid in which the number-bearing carriers are in the form of polyhedral blocks which can be selectively located in at least three discrete positions.

The invention provides a teaching aid comprising: a frame; a plurality of elongate rods mounted horizontally in the frame and spaced vertically from each other; and a plurality of polyhedral blocks rotatably mounted on each rod; wherein means are provided to releasably hold each polyhedral block in at least three discrete rotary positions on its respective rod.

Embodiments of the invention are described below with reference to the accompanying drawings, in which.

Figure 1:
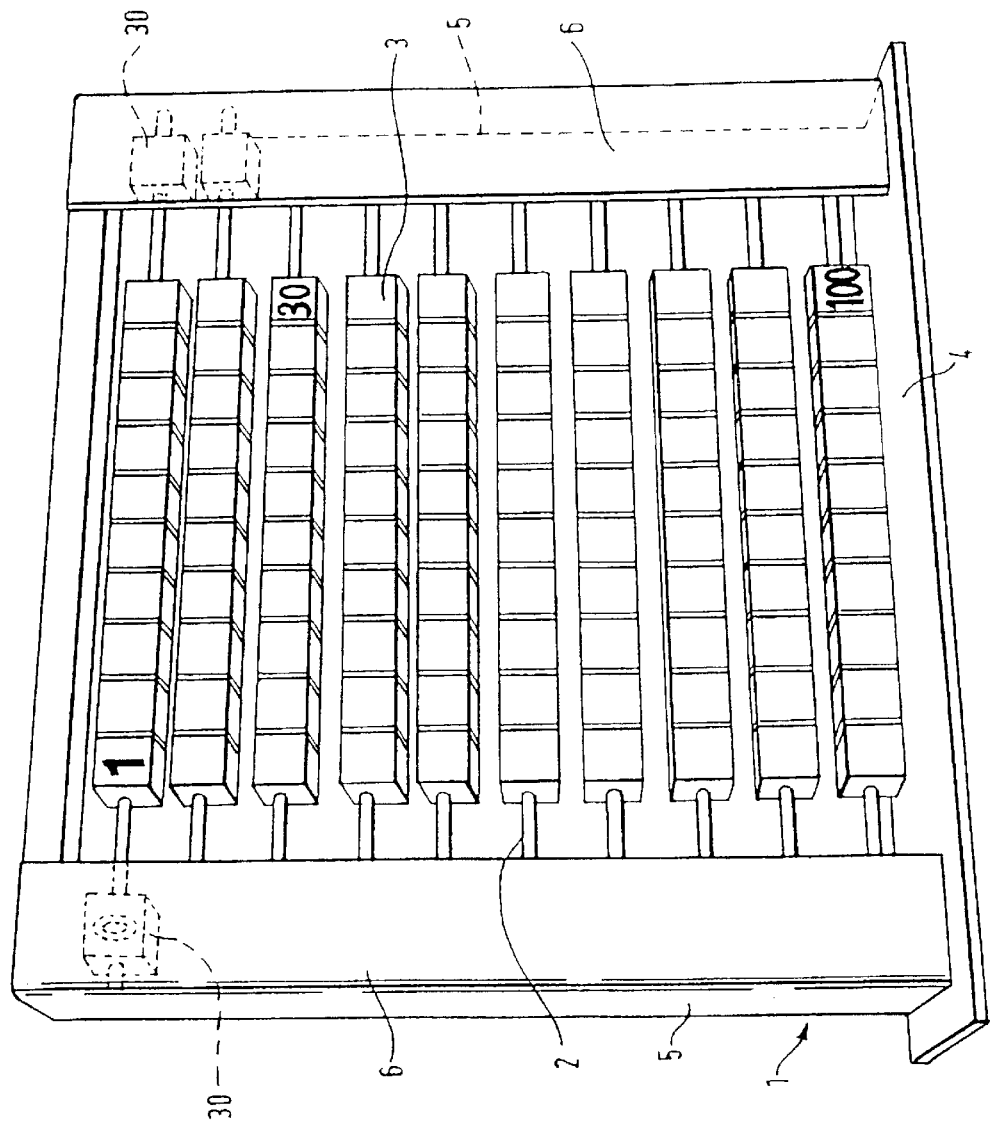
FIG. 1 is a perspective view of a teaching aid.

Referring to FIG. 1, it can be seen that the teaching aid comprises a frame 1, a plurality of rods 2 mounted horizontally in the frame and spaced apart vertically from each other, and a plurality of polyhedral blocks 3 rotatably mounted on each rod 2.

The frame comprises a base 4, a pair of upright frame members 5 supporting the ends of the rods 2, a pair of cover panels 6 connected to the frame members 5 and an upper cross piece 7. The frame is generally open so that as looked at in FIG. 2, the rods and blocks are generally visible with only end portions of the rods being covered by the panels 6.

Figure 2:
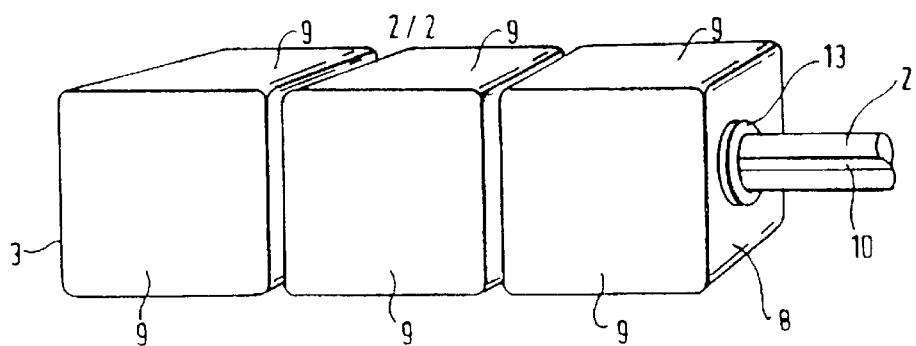
FIG. 2 is a partial view of a rod and three blocks of the teaching aid.
Figure 4:
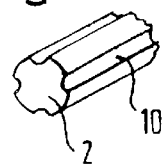
FIG. 4 is a partial view of a rod.
Figure 3:
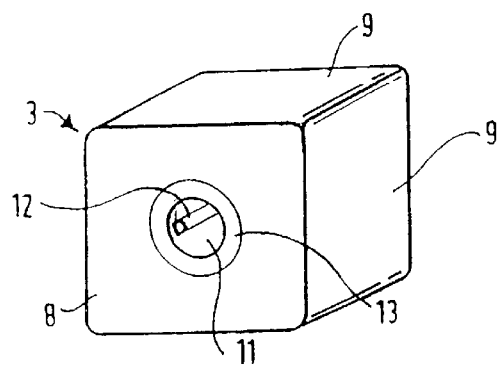
FIG. 3 is a perspective view of a block.

As shown in FIGS. 1–3, each block 3 is of cube shape having a pair of end faces 8 perpendicular to the length of its rod 2 and penetrated thereby. The block also has four side faces 9 lying in planes perpendicular to the planes of the end faces 8. An alternative block shown in FIG. 5 has only three side faces 9. Other blocks (not shown) may have five or more side faces.

The blocks are rotatably mounted on the rods and can be releasably held in a plurality of discrete rotary positions thereon corresponding to the number of side faces 9. Thus, the cube shaped blocks shown in FIGS. 1–3 can be rotated to four discrete rotary positions, each corresponding to a position where one of the four side faces 9 lies in a vertical plane at the front of the teaching aid which in use faces the students being taught.

One side face 9 of each block is blank or neutral whereas each of the other side faces 9 carries a numeral or symbol or other information. In addition, each side face 9 is colour coded. In one example, one side face of each block is coloured white and the blocks are numbered from 1 to 100 from top left to bottom right. A second side face of each block is coloured red and the blocks are numbered from 1 to 100 from bottom right to top left. A third side face of each block is coloured yellow and the rows of blocks are numbered from left to right in multiples of the number of that row from the top. Thus, the top row of blocks are numbered 1, 2, 3 . . . , the second row 2, 4, 6 . . . , the third 3, 6, 9 . . . and so on to 10, 20, 30 . . . Blocks coloured and numbered in this way can be used to carry out a number of different mathematical operations.

Figure 5:
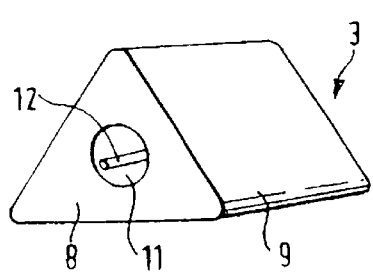
FIG. 5 is a perspective view of an alternative block.

In order to releasably hold the blocks in their discrete rotary positions, the rods are provided with a corresponding plurality of grooves 10 extending along their length. Each block has a bore 11 therethrough including means to co-operate with the grooves to hold the block in a selected one of its discrete rotary positions. As shown in FIGS. 3 and 5, the bores 11 of the blocks 3 are formed with a rib 12 which can co-operate with a groove 11 to hold the block in a selected rotary position. There is enough slack or resilience in this arrangement to enable the blocks to be easily rotated by hand from one position to the next. The bores 11 may be formed integrally of the blocks or in inserts 13 as shown. In another embodiment (not shown) the bore of each block is provided with a spring-loaded ball-bearing which locates in the grooves in the rod as the block is rotated.

Figure 6:
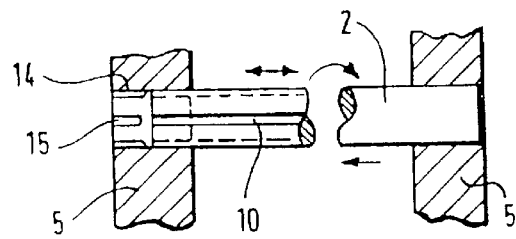
FIG. 6 is a partial view showing how the rods are supported in the frame of the teaching aid.

An arrangement enabling each rod to be rotated in the frame members 5 is shown in FIG. 6. The bore 14 through one of the frame members is formed with four short ribs 15 which co-operate to hold the rod against rotation when the rod is moved fully to the left in FIG. 6. The rod can be freely rotated, however, if it is first moved slightly to the right as shown in FIG. 6.

Figure 7:
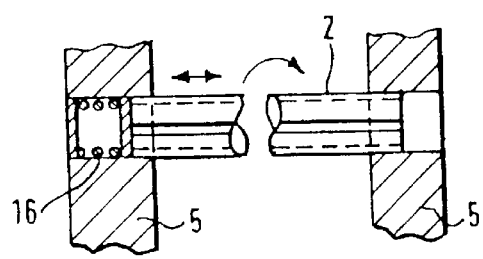
FIG. 7 is a partial view showing an alternative construction for supporting the rods in the frame.

In an alternative, shown in FIG. 7, a spring 16 is inserted in the recess of one end of the frame. At the other end, a square arrangement is provided—male on the rod 2 and female in the recess. The rod 2 is shorter than the distance between the ends of the two recesses thus enabling withdrawal from the square end by compressing the spring 16. The rod can then be turned and relocated in the desired position.

One or more additional blocks 30, as shown in phantom in FIG. 1, may be arranged on the ends of the rods 2 behind the panels 6. These additional blocks can be brought into play to modify the numbering array of the blocks. Thus, an array of numbers 1–100 (arranged as 1–10, 11–20, 21–30, etc) can be modified to an array of 0–99 (arranged as 0–9, 10–19, 20–29, etc).

In another embodiment, twelve rods 2 are provided giving an array of 1–120 which again can be modified to an array of 0–119.

What is claimed is:

1. A teaching aid comprising:

a frame;

a plurality of elongate rods mounted horizontally in the frame and spaced vertically from each other; and a plurality of polyhedral blocks rotatably mounted on each rod; wherein means are provided to releasably hold each polyhedral block in at least three discrete rotary positions on its respective rod; and wherein the rods are rotatably mounted in the frame and means are provided on the frame for releasably holding the rods against rotation in a plurality of discrete rotary positions.

2. A teaching aid as claimed in claim 1, wherein the frame includes a pair of upright frame members supporting the ends of the rods and wherein the rods are normally held against rotation and are released for rotation by being moved axially.

3. A teaching aid as claimed in claim 1 or claim 2, wherein at least some of the blocks have four side faces and can be releasably held in four discrete rotary positions on the respective rod.

4. A teaching aid as claimed in claim 1, wherein each rod is formed with a plurality of grooves extending along its length and wherein each block is provided with means to co-operate with the grooves to hold the block in a selected one of its discrete rotary positions.

5. A teaching aid as claimed in claim 4, further comprising a cover panel connected to each of the upright frame members.

* * * * *